Sept. 5, 1944.  G. R. KLINGENBERG  2,357,663
ELECTRODE HOLDER
Filed May 4, 1943  2 Sheets-Sheet 2
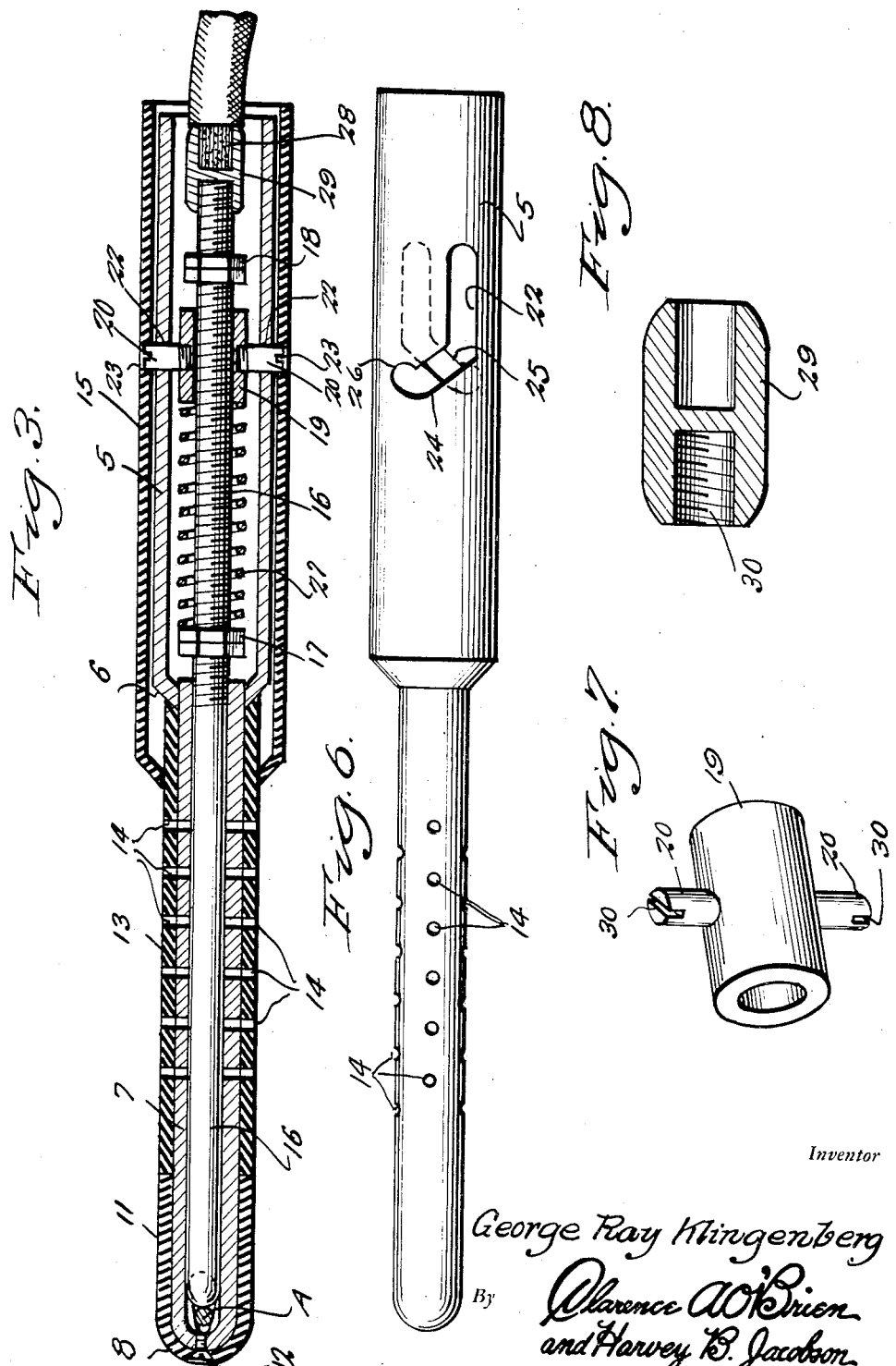
Inventor
George Ray Klingenberg
By Clarence A. O'Brien
and Harvey B. Jacobson
Attorneys Patented Sept. 5, 1944

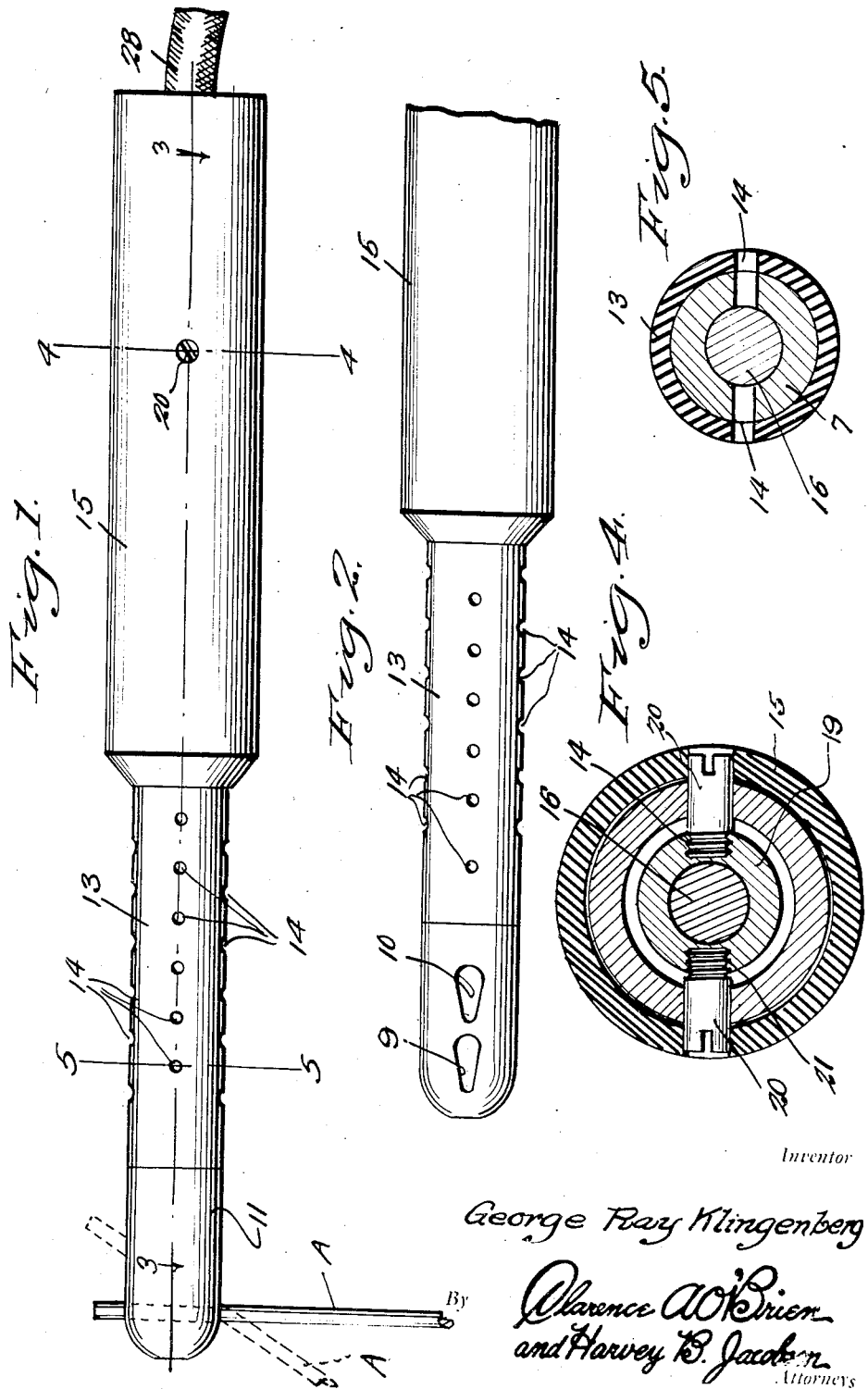

2,357,663

UNITED STATES PATENT OFFICE 2,357,663

ELECTRODE HOLDER

George Ray Klingenberg, San Francisco, Calif.

Application May 4, 1943, Serial No. 485,635

5 Claims. (Cl. 219—8)

This invention relates to new and useful improvements in holders such as are especially adapted for holding welding rods, electrodes and the like.

The principal object of the present invention is to provide a holder which will permit access of the electrode to presently considered inaccessible places.

Another important object of the invention is to provide a holder in which the electrode can be quickly and easily replaced.

Other objects and advantages of the invention will become apparent to the reader of the following description.

In the drawings:

Figure 1 is a side elevational view of the holder.

Figure 2 is a fragmentary bottom plan view of the holder.

Figure 3 is a longitudinal sectional view through the holder.

Figure 4 is a transverse sectional view (enlarged) on the line 4—4 of Figure 1.

Figure 5 is an enlarged cross sectional view on the line 5—5 of Figure 1.

Figure 6 is a side elevational view of the holder without the protective covering.

Figure 7 is a perspective view of the detent.

Figure 8 is a longitudinal sectional view through the coupling.

Referring to the drawings wherein like numerals designate like parts, it can be seen that the holder consists of an elongated hollow barrel 5, one end of which is disposed inwardly as at 6 and suitably secured to the inner end of a tube 7, this tube being closed and rounded off at one end as at 8 and at the bottom side of this end formed with a pair of longitudinally spaced tapering openings 9, 10. The top side of this end of the tube 7 has an opening so as to receive the upper end of a welding rod A regardless of which one of the openings 9, 10 the rod is inserted through.

A cap of insulation 11 is provided for the free end of the tube 7 and is secured in place by a set screw 12, this cap 11 having openings therein corresponding to the openings for the rod A.

A sleeve of insulation 13 is provided for the remaining portion of the tube 7 and this sleeve 13 as well as the intermediate portion of the tube 7 is formed with registering openings 14 to permit dissipation of any heat that may be conducted by the tube 7.

A longitudinally movable and rotatable handle 15 is provided for the barrel 5, the same being of some suitable insulation.

An elongated plunger 16 is longitudinally disposed through the tube 7 and also in the barrel 5, where it is formed with threads to accommodate nuts 17, 18. Slidable on the threaded portion is a collar 19 into which pins 20, 20 are threaded as suggested by numeral 21 in Figure 4. The pins 20, 20 project through longitudinally extending slots 22 in the upper and lower portions of the barrel 5 and into openings 23 in the handle 15. The slots 22 are in the nature of bayonet slots, the upper slot 22 having an obliquely disposed extension 24 which is oppositely disposed from a corresponding extension 25 of the lower slot 22, each of the oblique portions 24, 25 terminating in an offset receiving opening 26 for the corresponding pin 20.

A coiled compression spring 27 is interposed between one end of the collar 19 and the nuts 17.

A cable 28 has one end disposed into the socket at one end of a coupling 29, while the other end of the coupling 29 has a threaded recess 30 for the reception of the corresponding end of the plunger 16.

It can now be seen, that assuming that the pins 20, 20 are located within the receiving openings 26 of the bayonet slots 22, the spring 27 is compressed, and a rod A is being held by the forward end of the plunger 16.

By rotating the handle 15, after a slight forward movement, the handle 15 will ride backwardly due to the action of the spring 27 and this, in releasing the plunger 16, will permit the held rod A to release from the holder.

The outer ends of the pins 20 may be formed with kerfs 30 to permit actuation by a screw driver or the like.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. An electrode holder comprising an elongated hollow member, a plunger in the hollow member, said hollow member having an opening at one end for receiving an electrode, and against which the plunger is operative, spring means for the plunger and means for compressing the spring means to hold the plunger engaged with an electrode, said means for compressing the spring comprising a handle movably mounted on the elongated member, a collar adapted to be moved by the handle, said collar having a pin projecting through the member, said member having a bayonet slot for receiving the pin.

2. An electrode holder comprising an elongated hollow member, a plunger in the hollow member, said hollow member having an opening at one end for receiving an electrode, and against which the plunger is operative, spring means for the plunger and means for compressing the spring means to hold the plunger engaged with an electrode, said means for compressing the spring comprising a handle movably mounted on the elongated member, a collar adapted to be moved by the handle, said collar having a pin projecting through the member, said member having a bayonet slot for receiving the pin, said collar being operative against the spring by moving the handle to compress said spring and exert pressure on the plunger.

3. An electrode holder comprising a tube closed at its outer end and having an insulating cap fitted and secured over said end, an insulating sleeve covering the remainder of said tube, the tube and the cap having aligned openings at opposite sides to receive a welding rod, an elongated hollow barrel having a contracted end secured on the inner end of said tube and provided with opposed bayonet slots, a tubular insulating handle surrounding said barrel and rotatably and longitudinally movable relative to the latter, a plunger slidable in the tube and extending into the barrel, a spring on the plunger compressible to urge the latter against the welding rod, a sleeve slidable on the plunger, and pins projecting from the sleeve outwardly through said bayonet slots and engaged with the handle so that rotation of the latter will cause movement of the sleeve to compress or relieve compression of said spring.

4. An electrode holder comprising a tube closed at its outer end and having an insulating cap fitted and secured over said end, an insulating sleeve covering the remainder of said tube, the tube and the cap having aligned openings at opposite sides to receive a welding rod, an elongated hollow barrel having a contracted end secured on the inner end of said tube and provided with opposed bayonet slots, a tubular insulating handle surrounding said barrel and rotatably and longitudinally movable relative to the latter, a plunger slidable in the tube and extending into the barrel, a spring on the plunger compressible to urge the latter against the welding rod, a sleeve slidable on the plunger, and pins projecting from the sleeve outwardly through said bayonet slots and engaged with the handle so that rotation of the latter will cause movement of the sleeve to compress or relieve compression of said spring, the tube and the cap having aligned openings at one side longitudinally spaced from the first-named openings so that the welding rod may be received at different angles relative to the holder.

5. An electrode holder comprising a tube closed at its outer end and having an insulating cap fitted and secured over said end, an insulating sleeve covering the remainder of said tube, the tube and the cap having aligned openings at opposite sides to receive a welding rod, an elongated hollow barrel having a contracted end secured on the inner end of said tube and provided with opposed bayonet slots, a tubular insulating handle surrounding said barrel and rotatably and longitudinally movable relative to the latter, a plunger slidable in the tube and extending into the barrel, a spring on the plunger compressible to urge the latter against the welding rod, a sleeve slidable on the plunger, and pins projecting from the sleeve outwardly through said bayonet slots and engaged with the handle so that rotation of the latter will cause movement of the sleeve to compress or relieve compression of said spring, said tube and said sleeve having a series of aligned heat-dissipating openings.

GEORGE RAY KLINGENBERG.